(12) United States Patent
Nishimura

(10) Patent No.: US 10,496,624 B2
(45) Date of Patent: Dec. 3, 2019

(54) INDEX KEY GENERATING DEVICE, INDEX KEY GENERATING METHOD, AND SEARCH METHOD

(71) Applicant: NEC Corporation, Minato-ku, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 681 days.

(21) Appl. No.: 14/758,935

(22) PCT Filed: Oct. 25, 2013

(86) PCT No.: PCT/JP2013/078931
§ 371 (c)(1),
(2) Date: Jul. 1, 2015

(87) PCT Pub. No.: WO2014/109109
PCT Pub. Date: Jul. 17, 2014

(65) Prior Publication Data
US 2015/0356128 A1    Dec. 10, 2015

(30) Foreign Application Priority Data
Jan. 11, 2013    (JP) .................................. 2013-003842

(51) Int. Cl.
*G06F 17/30* (2006.01)
*G06F 16/22* (2019.01)

(52) U.S. Cl.
CPC ............................... *G06F 16/2237* (2019.01)

(58) Field of Classification Search
CPC ..................... G06F 17/30324; G06F 16/2237

USPC ........................................................ 707/745
See application file for complete search history.

(56) References Cited

U.S. PATENT DOCUMENTS

| 3,611,316 | A | * | 10/1971 | Woodrum | G06F 3/00 |
| 5,283,894 | A | * | 2/1994 | Deran | G06F 17/30327 707/704 |
| 5,684,986 | A | * | 11/1997 | Moertl | G06F 3/0601 |
| 5,742,806 | A | * | 4/1998 | Reiner | G06F 17/30445 |

(Continued)

FOREIGN PATENT DOCUMENTS

| JP | 63-286931 A | 11/1988 |
| JP | 2004-534981 A | 11/2004 |

(Continued)

OTHER PUBLICATIONS

International Search Report for PCT Application No. PCT/JP2013/078931, dated Dec. 3, 2013.

(Continued)

*Primary Examiner* — Mark E Hershley

(57) ABSTRACT

An index key generating device includes: a data acquiring unit which acquires a plurality of attribute values of a plurality of attributes for indexing; a definition acquiring unit which acquires index definition information indicating, for each of the attributes for indexing, an arrangement of bits of the attribute in an index key; and a bit processing unit which generates an index key by arranging, on a bit-by-bit basis, the plurality of attribute values acquired by the data acquiring unit, on the basis of the index definition information acquired by the definition acquiring unit.

15 Claims, 16 Drawing Sheets

(56) References Cited

U.S. PATENT DOCUMENTS

| | | | | |
|---|---|---|---|---|
| 7,366,873 B1* | 4/2008 | Kohn | ................. | G06F 15/8053 |
| | | | | 712/4 |
| 8,706,914 B2* | 4/2014 | Duchesneau | ......... | G06F 9/5072 |
| | | | | 709/203 |
| 2003/0004938 A1* | 1/2003 | Lawder | ............. | G06F 17/30333 |
| 2004/0133927 A1* | 7/2004 | Sternberg | .......... | G06F 17/30247 |
| | | | | 725/136 |
| 2006/0041569 A1* | 2/2006 | Beck | ................ | G06F 17/30592 |
| 2006/0235878 A1* | 10/2006 | Shipp | .................. | G06F 17/3056 |
| 2007/0294496 A1* | 12/2007 | Goss | .................. | G06F 12/1408 |
| | | | | 711/163 |
| 2008/0016037 A1* | 1/2008 | Enomoto | ............... | G01C 21/26 |
| 2008/0104102 A1* | 5/2008 | Zhang | ............ | G06F 17/30336 |
| 2009/0172364 A1* | 7/2009 | Sprangle | ............ | G06F 9/30043 |
| | | | | 712/225 |
| 2010/0201988 A1* | 8/2010 | Kiesel | ................... | G01N 21/05 |
| | | | | 356/419 |
| 2011/0060745 A1* | 3/2011 | Hoffman | ........... | G06F 17/30492 |
| | | | | 707/748 |
| 2011/0107237 A1* | 5/2011 | Takao | ................... | G06Q 30/02 |
| | | | | 715/753 |
| 2011/0222062 A1* | 9/2011 | Martini | ................. | G01N 21/05 |
| | | | | 356/417 |
| 2011/0252073 A1* | 10/2011 | Pauly | ............... | G06F 17/30297 |
| | | | | 707/812 |
| 2012/0166446 A1* | 6/2012 | Bowman | ........... | G06F 17/30241 |
| | | | | 707/743 |
| 2012/0254593 A1* | 10/2012 | San Adrian | ......... | G06F 9/30018 |
| | | | | 712/205 |
| 2013/0013602 A1* | 1/2013 | Manner | ............. | G06F 17/30501 |
| | | | | 707/737 |
| 2013/0304823 A1* | 11/2013 | Sato | .................... | H04L 67/1042 |
| | | | | 709/204 |
| 2013/0326160 A1* | 12/2013 | Sperber | ............... | G06F 9/30036 |
| | | | | 711/154 |
| 2014/0095779 A1* | 4/2014 | Forsyth | ................... | G06F 12/00 |
| | | | | 711/105 |
| 2014/0108769 A1* | 4/2014 | Jha | ...................... | G06F 9/30036 |
| | | | | 712/205 |
| 2015/0074373 A1* | 3/2015 | Sperber | ............... | G06F 9/30145 |
| | | | | 712/7 |

FOREIGN PATENT DOCUMENTS

| | | |
|---|---|---|
| JP | 2007-233658 A | 9/2007 |
| JP | 2009-048352 A | 3/2009 |
| JP | 2009-069971 A | 4/2009 |
| JP | 2009-301582 A | 12/2009 |

OTHER PUBLICATIONS

English translation of Written opinion for PCT Application No. PCT/JP2013/078931.

Sam Lightstone, Toby Teorey, Tom Nadeau, "Physical Database Design: the database professional's guide to exploiting indexes, view, storage, and more", lines 22-24 p. 21, p. 22, figures 2 and 3, 2006. Cited in the specification.

Volker Markl, "MISTRAL: Processing Relational Queries using a Multidimensional Access Technique", p. 103 (Algorithm 5-1), Jul. 25, 1999. Cited in the specification.

* cited by examiner

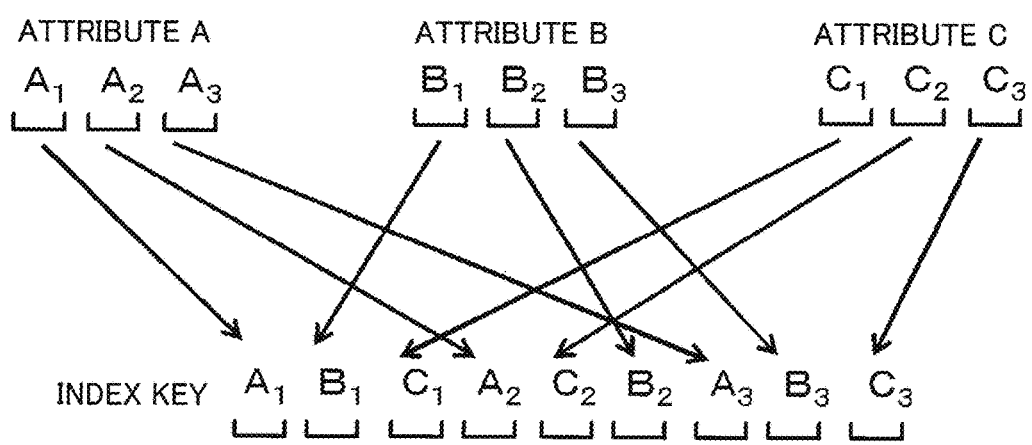

INDEX KEY GENERATING DEVICE, INDEX KEY GENERATING METHOD, AND SEARCH METHOD

This application is a National Stage Entry of PCT/JP2013/078931 filed on Oct. 25, 2013, which claims priority from Japanese Patent Application 2013-003842 filed on Jan. 11, 2013, the contents of all of which are incorporated herein by reference, in their entirety.

TECHNICAL FIELD

The present invention relates to a technique for generating a multidimensional index key. Here, a multidimensional index key corresponds to an index key generated from values indicating multiple attributes for indexing.

BACKGROUND ART

It is often the case that, in order to increase the speed of database search with specified conditions for multiple attributes, an index is generated on the basis of the multiple attributes. The following two techniques are known as methods of generating an index based on multiple attributes.

The first technique is a method called compound index (refer to NPL 1, below). In the compound index, priorities are assigned to multiple attributes desired to be used for an index, and the attributes are sorted in order of priority and stored. Specifically, assume a case where the attribute value of an attribute A is represented by a bit string "$A_1A_2A_3A_4$" and the attribute value of an attribute B is represented by a bit string "$B_1B_2B_3B_4$". In this case, an index key "$A_1A_2A_3A_4|B_1B_2B_3B_4$", which is formed by connecting the individual attribute values with a separation mark "|", is sorted, and the sorting result is stored. Since attribute values are sorted in order of priority, it is possible to generate a compound index even when the attributes have attribute values that are different in bit length. Moreover, when attribute values are discrete values, the efficiency of query processing with a specified matching condition for the attribute values can be increased.

The second technique is a method called UB-Tree (refer to NPL 2, below). In the UB-Tree, an index key is generated by targeting multiple attributes desired to be used for an index, by alternately arranging the bits of the attribute values on a bit-by-bit basis, and the index key is sorted and stored. Specifically, assume a case where the attribute value of an attribute A is represented by a bit string "$A_1A_2A_3A_4$" and the attribute value of an attribute B is represented by a bit string "$B_1B_2B_3B_4$". In this case, the bits of the attribute values are alternately arranged on a bit-by-bit basis. Through this operation, the UB-Tree generates an index key "$A_1B_1A_2B_2A_3B_3A_4B_4$" and stores, as an index, the result obtained by sorting the index key. According to the UB-Tree, in which the bits of attribute values are alternately arranged on a bit-by-bit basis, it is relatively easy to obtain continuity for the attributes, so that efficiency in range search is likely to be higher than that in the above-described compound index. The index key generating technique employed in the UB-Tree is called bit-interleaving or Z-ordering, for example. In the following description, a method of generating an index key by alternately arranging the bits of attribute values on a bit-by-bit basis is referred to representatively as bit-interleaving.

The UB-Tree, which alternately arranges the bits of attribute values on a bit-by-bit basis, is based on the assumption that the bit lengths of attribute values are the same. Zero padding is often employed in order to have the same bit length for all pieces of data. However, zero padding increases index keys in size.

To address this problem, in the technique proposed in NPL 2, the order of arranging bits is limited to the descending order of bit length of attribute values, and an index key is generated by skipping, when the bit length of an attribute value exceeds a certain length, the attribute. In other words, the proposed technique addresses the problem of the difference in bit length among attribute values by limiting the generation method to one in which an index key is generated by alternately arranging the bits of the bit strings of attribute values in a left-justified manner.

CITATION LIST

Non Patent Literature

[NPL 1] Sam Lightstone, Toby Teorey, Tom Nadeau, "Physical Database Design: the database professional's guide for exploiting indexes, view, storage, and more", lines 22-24 page 21, page 22, FIGS. 2 and 3, 2006

[NPL 2] Volker Markl, "MISTRAL: Processing Relational Queries using a Multidimensional Access Technique", page 103 (Algorithm 5-1), Jul. 25, 1999

SUMMARY OF INVENTION

Technical Problem

In the above-described compound index and bit-interleaving, multidimensional spaces represented using multiple attributes are converted into an index key which is a one-dimensional space, by a plain method of simply connecting bit strings to each other or alternately arranging bits in a regular manner. This means that these techniques considerably limit index key generation patterns. For this reason, using these techniques may reduce the efficiency of a range search process depending on the specified content for a range search or the distribution of data for indexing.

For example, in the case of employing the above-described compound index, the efficiency of a range search process is likely to decrease when attributes having continuous values are specified. This is because index keys are arranged consecutively for attributes given high priorities whereas index keys are arranged at intervals for attributes given low priorities.

In the case of employing the above-described bit-interleaving, the efficiency of a range search process is likely to decrease when the search ranges of respective attributes are greatly different in width or the search ranges of respective attributes are independently specified. This is because the bit-interleaving is a technique which assumes range search in which the search ranges of respective attributes are specified so as to be approximately the same in width as in a case of specifying the range of position information by using latitude and longitude. For example, the range of position information is often specified as a range that is within 1 km square or within 10 km from a certain spot.

The present invention has been made in view of the above-described circumstances, and provides a multidimensional-index-key generating technique which enables high search efficiency in any search environment. The search environment includes all kinds of situations related to searching such as the distribution of the values of multiple attributes for searching and search characteristics (search state) of multiple attributes for searching, for example.

Solution to Problem

To solve the above-described problems, aspects of the present invention have the following configurations.

A first aspect relates to an index key generating device. The index key generating device according to the first aspect includes: a data acquiring unit which acquires a plurality of attribute values of a plurality of attributes for indexing; a definition acquiring unit which acquires index definition information indicating, for each of the attributes for indexing, an arrangement of bits of the attribute in an index key; and a bit processing unit which generates the index key by arranging, on a bit-by-bit basis, the plurality of attribute values acquired by the data acquiring unit, on the basis of the index definition information acquired by the definition acquiring unit.

A second aspect relates to an index key generating device. The index key generating device according to the second aspect includes: a data acquiring unit which acquires a plurality of attribute values of a plurality of attributes for indexing; and a bit processing unit which generates an index key by arranging, on a bit-by-bit basis, the plurality of attribute values of the plurality of attributes acquired by the data acquiring unit, wherein the bit processing unit arranges the plurality of attribute values on a bit-by-bit basis so that order in a bit string of each of the attributes is maintained, so that the bit string of at least one of the plurality of attributes is arranged separately, and so that a bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively.

A third aspect relates to an index key generating method. The index key generating method according to the third aspect includes: acquiring a plurality of attribute values of a plurality of attributes for indexing; acquiring index definition information indicating, for each of the attributes for indexing, an arrangement of bits of the attribute in an index key; and generating the index key by arranging, on a bit-by-bit basis, the acquired plurality of attribute values, on the basis of the acquired index definition information.

A fourth aspect relates to an index key generating method. The index key generating method according to the fourth aspect includes: acquiring a plurality of attribute values of a plurality of attributes for indexing; and generating an index key by arranging the plurality of attribute values of the acquired plurality of attributes on a bit-by-bit basis, wherein, in the generating of the index key, the plurality of attribute values are arranged on a bit-by-bit basis so that order in a bit string of each of the attributes is maintained, so that the bit string of at least one of the plurality of attributes is arranged separately, and so that a bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively.

A fifth aspect relates to an index-key data structure formed by arranging multiple attribute values of multiple attributes on a bit-by-bit basis. The data structure of an index key formed by arranging a plurality of attribute values of a plurality of attributes on a bit-by-bit basis, wherein, in the index key, order in a bit string of each of the attributes is maintained, the bit string of at least one of the plurality of attributes are arranged separately, and a bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively, and a computer refers to the data structure of the index key in order to identify an index key set corresponding to a search range based on a plurality of attributes for searching specified in a query data from an index formed by sorting the index key.

Another aspect of the present invention may be a program which causes at least one computer to execute the method according to the above-described third aspect or the method according to the above-described fourth aspect, or may be a computer-readable recording medium in which such a program is stored. The recording medium includes a non-temporary physical medium. Another aspect of the present invention may be a search method using an index obtained by sorting an index key generated by the device or through the method according to any one of the above-described aspects.

Advantageous Effects of Invention

According to the above-described aspects, it is possible to provide a multidimensional-index-key generating technique which enables high search efficiency in any search environment.

BRIEF DESCRIPTION OF DRAWINGS

The above-given aim, other aims, characteristics and advantages become more apparent with reference to the preferable exemplary embodiments described below and the accompanying drawings given below.

FIG. 4D is a diagram illustrating an example of index key generation according to another exemplary embodiment.

DESCRIPTION OF EMBODIMENTS

Exemplary embodiments of the present invention are described below. Note that the following exemplary embodiments are provided for illustrative purposes and that the present invention is not limited to the configurations of the following exemplary embodiments.

Figure 1:
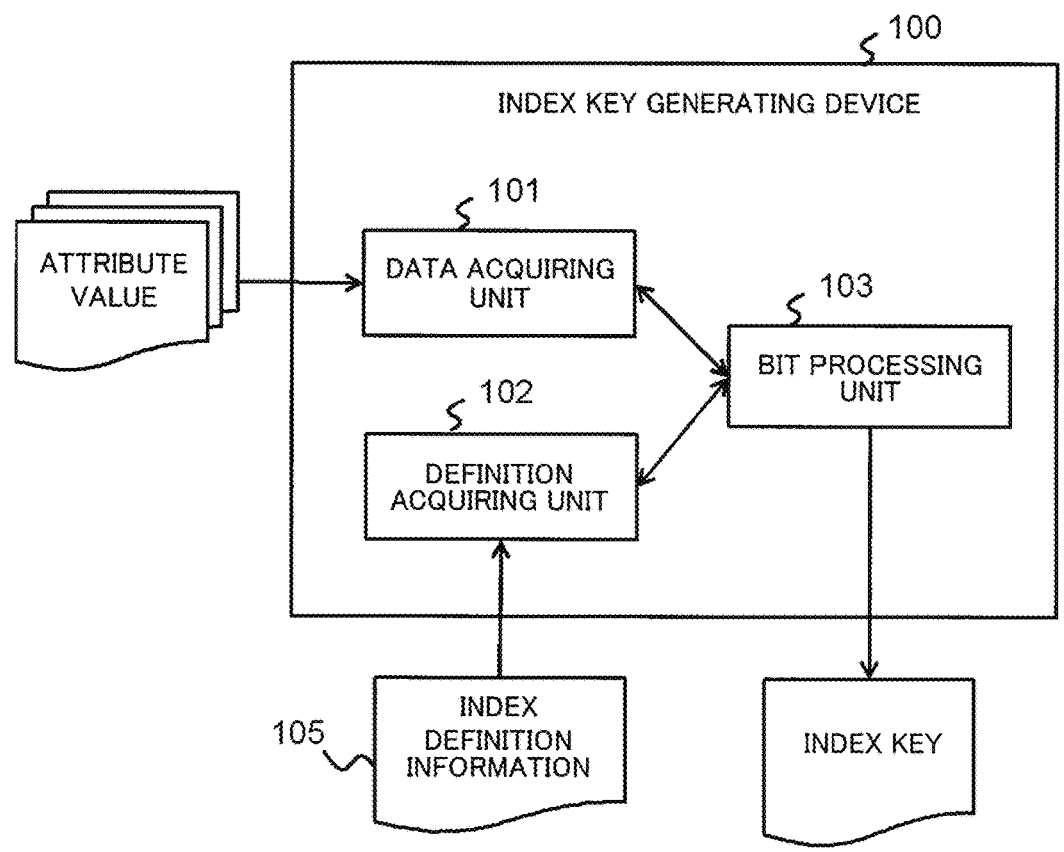
FIG. 1 is a diagram schematically illustrating an example of a configuration of an index key generating device according to an exemplary embodiment of the present invention.

FIG. 1 is a diagram schematically illustrating an example of a configuration of an index key generating device 100 according to an exemplary embodiment of the present invention. As illustrated in FIG. 1, the index key generating device 100 includes a data acquiring unit 101 which acquires multiple attribute values of multiple attributes for indexing and a definition acquiring unit 102 which acquires index definition information 105 indicating, for each attribute for indexing, the positions of the respective bits of the attribute in an index key. In addition to these, the index key generating device 100 includes a bit processing unit 103 which generates the index key by arranging, on a bit-by-bit basis, the multiple attribute values acquired by the data acquiring unit 101, with reference to the index definition information 105 acquired by the definition acquiring unit 102.

The index key generating device 100 has, for example, the same hardware configuration as that of a search device 1 of any one of the exemplary embodiments to be described later, and each of the above-described processing units is implemented by executing a program as for the search device 1.

An index key generating method according to the exemplary embodiment of the present invention includes acquiring multiple attribute values of multiple attributes for indexing and acquiring index definition information indicating, for each attribute for indexing, the positions of the respective bits of the attribute in an index key. In addition to these, the index key generating method includes generating the index key by arranging the acquired multiple attribute values on a bit-by-bit basis, with reference to the acquired index definition information. Note that the steps included in the index key generating method may be executed one by one in no particular order or may be executed at the same time. The index key generating method is executed by at least one computer such as the above-described index key generating device 100.

As described above, in this exemplary embodiment, the index definition information 105 is acquired for each attribute for indexing, the index definition information 105 indicating the positions of the respective bits of the attribute in an index key, and the bits of the attribute are arranged on the basis of the index definition information 105. In this way, a multidimensional index key corresponding to the multiple attribute values of the multiple attributes for indexing acquired by the data acquiring unit 101 is generated.

As described previously, since index key generation patterns are considerably limited in the known two methods for generating index key, each of these methods has search environments which cause to decrease the efficiency of range search. Moreover, in the case of employing a method from these two methods only, when the number of attributes for indexing increases, the search space corresponding to the search range in the index space increases. Consequently the search efficiency decreases. This is due to an increase in the possibility that bits having no influence on the search range are included in the bit width corresponding to the search range in an index key.

With this knowledge, the inventors of the present invention found that there may be other index key generation patterns which are more suitable for individual search environments than those of the two existing methods only.

In the case of sorting data records according to an index key, the index key serves as an index indicating the distance between the attributes for indexing. Specifically, the records which are close to each other in the order after the index key is sorted are likely to be located close to each other in a storage medium. In addition, range search is operation for acquiring records each having attribute values being within a specified range. Hence, when a set of records to be acquired is arranged together in the storage medium, the records can be acquired all at once, which improves the efficiency of the range search.

The inventors of the present invention drew attention to the bit pattern of the attribute values of each record extracted through range search. Since attribute value strings obtained by sorting the attribute values of the extracted records are continuous values in the search range, it is expected that the patterns of the high-order bits of the attribute values are approximately the same whereas the patterns of the low-order bits of the attribute values are different from each other. Accordingly, it is understood that range search for index keys generated on the basis of attributes having continuous values or discrete values having an implication of continuity is the same as tracing to a change in width of several low-order bits in the index key. The inventors of the present invention found an idea that arranging the low-order bits having the bit length corresponding to the width of the search range for each attribute in the bit string of the attribute, at respective positions as close as possible to the low-order bit side (right side) in the index key. This makes it possible for the index keys corresponding to the search range to be easily arranged close to each other in the storage medium, which improves search efficiency.

Figure 2:
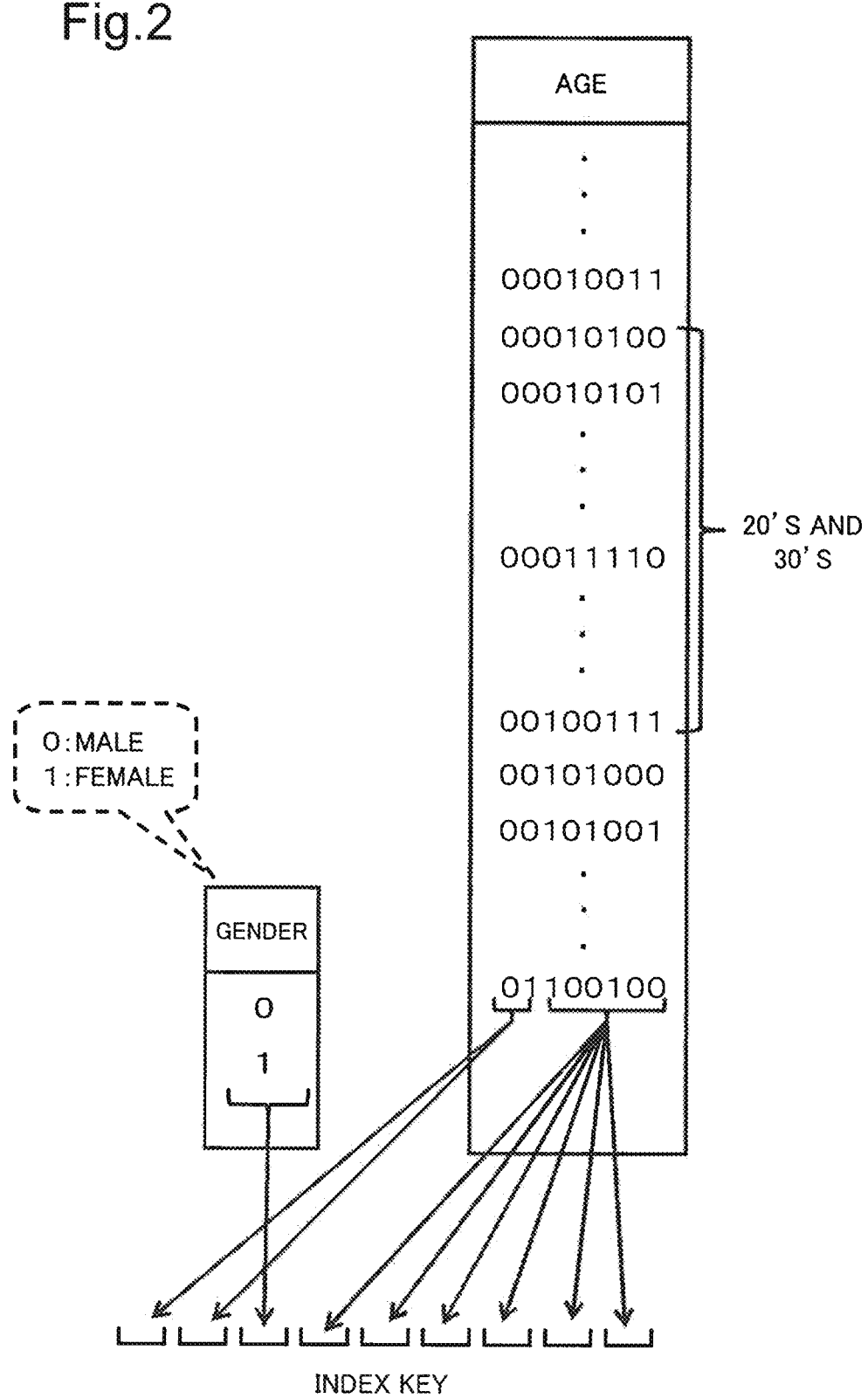
FIG. 2 is a diagram illustrating an example of index key generation.

FIG. 2 is a diagram illustrating an example of index key generation. FIG. 2 presents an example of a case in which "gender" and "age" are set as attributes for indexing and "20's and 30's" of the attribute "age" is frequently specified as a search range. In this case, the search range based on "20's and 30's" of the attribute "age" corresponds to the six lowest-order bits of the attribute "age". In view of this, for example, the six lowest-order bits of the attribute "age" are arranged on the low-order bit side in each index key, one bit of the attribute "gender" is arranged as a higher-order bit of the six bits, and the remaining two bits of the attribute "age" are arranged at the remaining bit positions of the index key. Consequently, index key strings corresponding to "male" and "20's and 30's" and index key strings corresponding to "female" and "20's and 30's" are aligned successively, which improves search efficiency. In contrast, when index keys are generated through the compound index method in the example in FIG. 2, index key strings are aligned in the order of "male" and "all ages", and "female" and "all ages". This increases the range of the index key space corresponding to the search range of "20's and 30's" of "all genders" compared with that in the example in FIG. 2, which decreases the search efficiency.

As can be seen above, index key bit arrangement which is capable of improving search efficiency changes depending on the search environment such as the distribution of the values of multiple attributes for searching and the search characteristics (search state) related to the multiple attribute for searching. In view of this, the inventors of the present invention reached an idea that the use of an index key generation pattern which is appropriate for each search environment, that is, increasing the flexibility in an index key design technique, leads to an improvement in search efficiency.

Hence, in this exemplary embodiment, the index definition information 105, which allows flexible setting for arrangement of bits of the attributes for indexing in an index key, is used, and an index key is generated so as to include the attribute values arranged on a bit-by-bit basis according to the setting in the index definition information 105. In this way, fine adjustment can be made to the positions of the respective bits of the attributes in each index key, and hence it is possible to generate an index key which is suitable for range search desired to have improved efficiency, according to this exemplary embodiment. In other words, according to this exemplary embodiment, an index key design technique which is suitable for each search environment can be used flexibly, which consequently improves search efficiency. In particular, this exemplary embodiment exerts a large effect when each attribute has a search range of a typical width in multidimensional range search.

Figure 3:
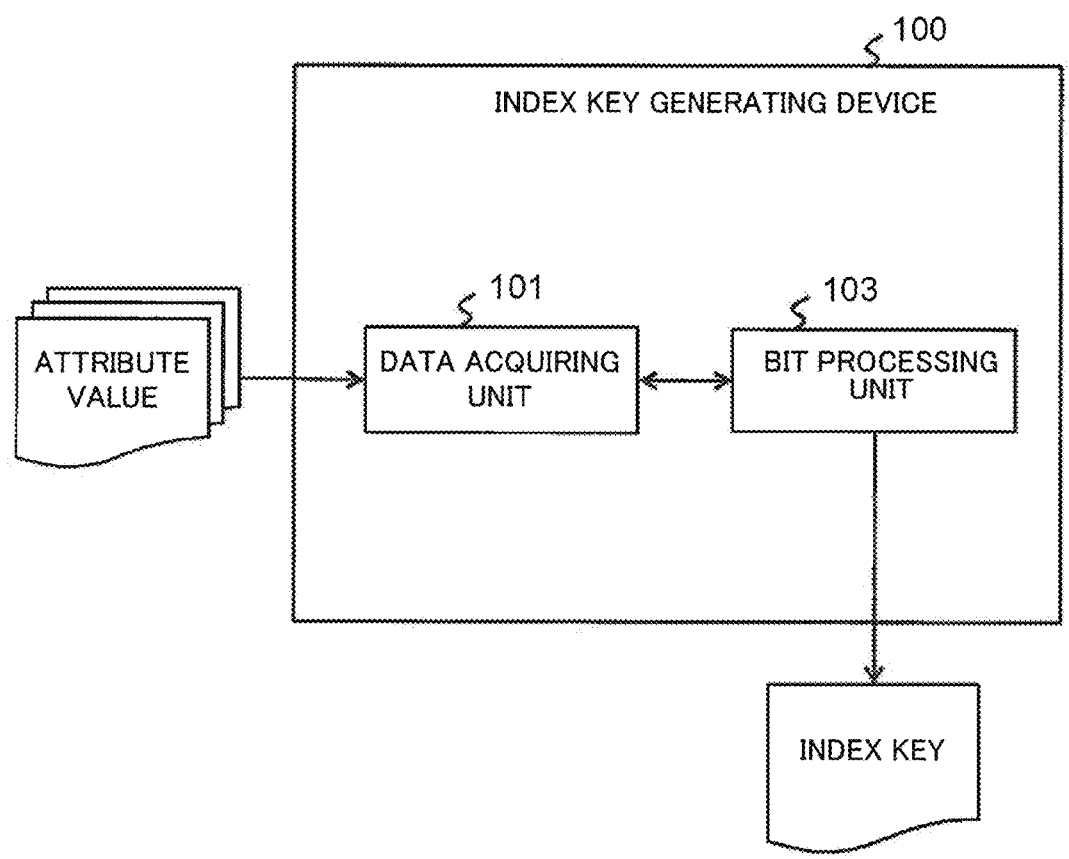
FIG. 3 is a diagram schematically illustrating an example of a configuration of an index key generating device according to another exemplary embodiment.

The above-described exemplary embodiment may be modified as follows under the above-described technical ideas. FIG. 3 is a diagram schematically illustrating an example of a configuration of an index key generating device 100 according to another exemplary embodiment. The index key generating device 100 according to another exemplary embodiment is different from that of the above-described mode in that the definition acquiring unit 102 is not included. In the example in FIG. 3, to generate an index key, the bit processing unit 103 arranges, on a bit-by-bit basis, multiple attribute values of multiple attributes acquired by the data acquiring unit 101. Specifically, the bit processing unit 103 arranges the bits of the attributes so that the order of the bits in the bit string of each attribute is maintained, so that the bit string of at least one of the multiple attributes is arranged separately, and so that bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively.

An index key generating method according to another exemplary embodiment includes acquiring multiple attribute values of multiple attributes for indexing and generating an index key by arranging, on a bit-by-bit basis, multiple attribute values of the acquired multiple attributes so that the order of the bits in the bit string of each attribute is maintained, so that the bit string of at least one of the multiple attributes is arranged separately, and so that bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of the same attribute being arranged consecutively.

Figure 4A:
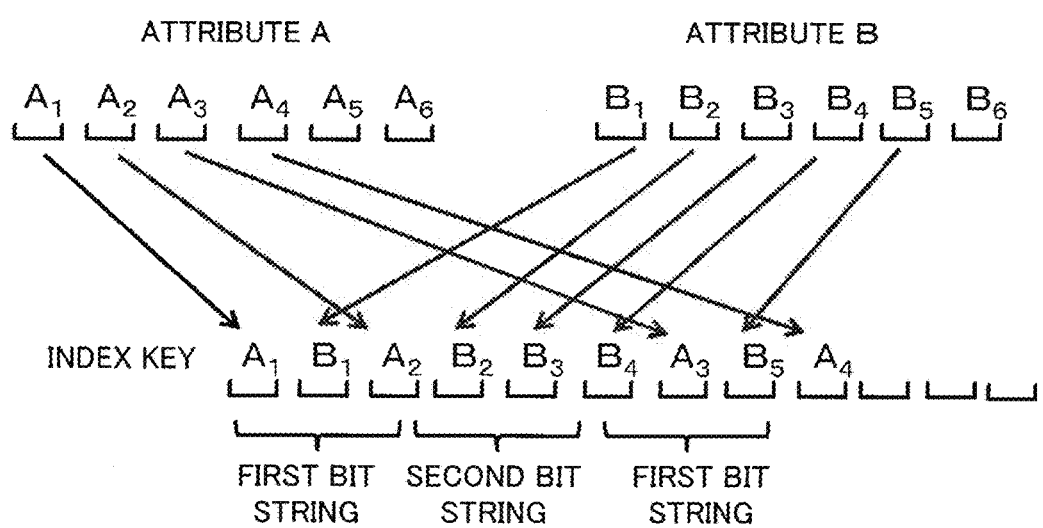
FIG. 4A is a diagram illustrating an example of index key generation according to another exemplary embodiment.
Figure 4B:
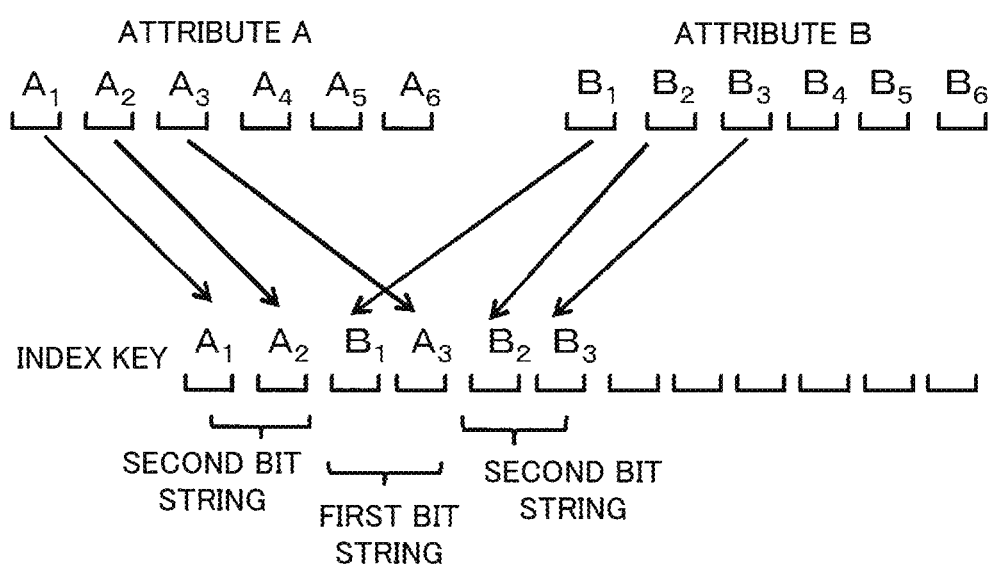
FIG. 4B is a diagram illustrating an example of index key generation according to another exemplary embodiment.

FIG. 4A and FIG. 4B are diagrams each illustrating an example of index key generation according to another exemplary embodiment. The index key generated in the example in FIG. 4A has a bit arrangement in which a first bit string "$A_1B_1A_2$" and a first bit string "$A_3B_5A_4$" are arranged so as to have a second bit string "$B_2B_3B_4$" therebetween. The index key generated in the example in FIG. 4B has a bit arrangement in which a second bit string "$A_1A_2$" and a second bit string "$B_2B_3$" are arranged so as to have a first bit string "$B_1A_3$" therebetween.

An index key generating method according to another exemplary embodiment includes acquiring multiple attribute values of multiple attributes for indexing and generating an index key by arranging, on a bit-by-bit basis, multiple attribute values of the acquired multiple attributes so that the order of the bits in the bit string of each attribute is maintained, so that the bit string of at least one of the multiple attributes is arranged separately, and so that two or more bit strings each of which includes two or more attributes and which have different attribute arrangements are included in multiple bit strings obtained by arranging i-th bit values of the respective attributes in the order of arranging the bit values in the index key. The bit string which has different attribute arrangement indicates a bit string including a different number of attributes or a bit string in which the same number of attributes are arranged in different orders.

Figure 4C:
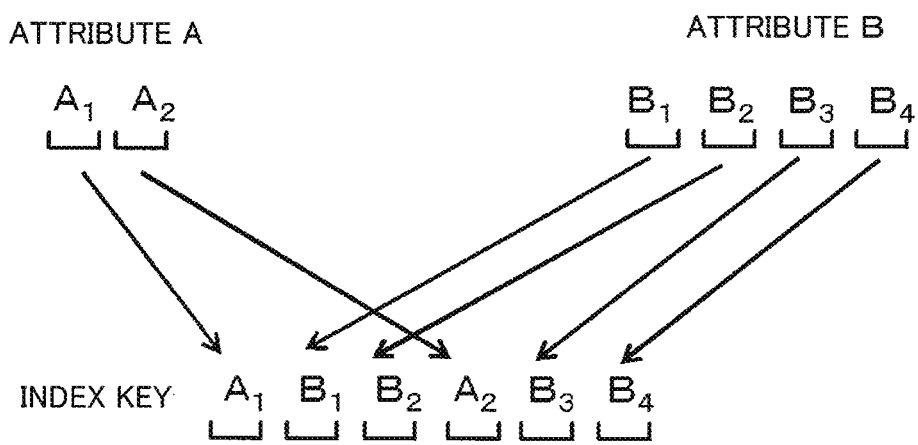
FIG. 4C is a diagram illustrating an example of index key generation according to another exemplary embodiment.
Figure 4E:
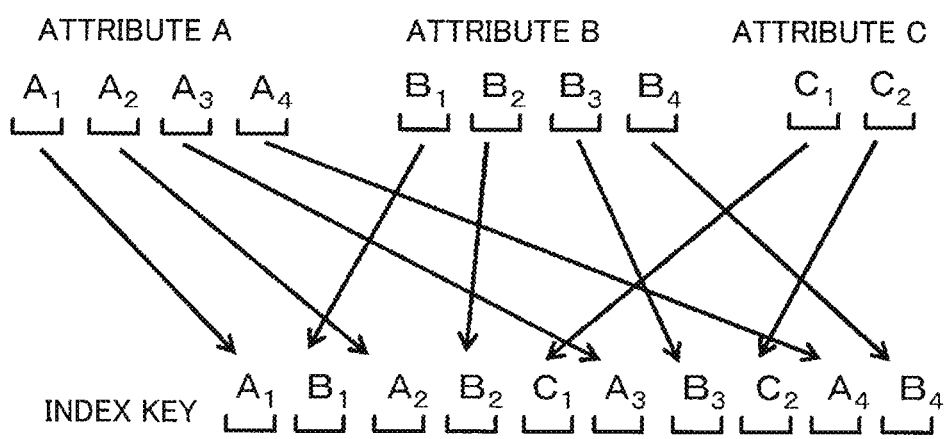
FIG. 4E is a diagram illustrating an example of index key generation according to another exemplary embodiment.

FIG. 4C, FIG. 4D, and FIG. 4E are diagrams each illustrating an example of index key generation according to another exemplary embodiment. According to the above-described index key generating method, an index key having bit arrangement as that illustrated in any one of FIG. 4C, FIG. 4D, and FIG. 4E can be generated. In FIG. 4C, multiple bit strings in each of which i-th bit values of the respective attributes are arranged are "$A_1B_1$", "$B_2A_2$", "$B_3$", and "$B_4$", and the bit strings "$A_1B_1$" and "$B_2A_2$", each of which includes two or more attributes and which have different attribute arrangements, are included. In FIG. 4D, the multiple bit strings are "$A_1B_1C_1$", "$A_2C_2B_2$", and "$A_3B_3C_3$", and the bit strings "$A_1B_1C_1$" and "$A_2C_2B_2$", each of which includes two or more attributes and which have different attribute arrangements, are included. In FIG. 4E, the multiple bit strings are "$A_1B_1C_1$", "$A_2B_2C_2$", "$A_3B_3$", and "$A_4B_4$", and the bit strings "$A_1B_1C_1$" and "$A_3B_3$", each of which includes two or more attributes and which have different attribute arrangement, are included.

Figure 4F:
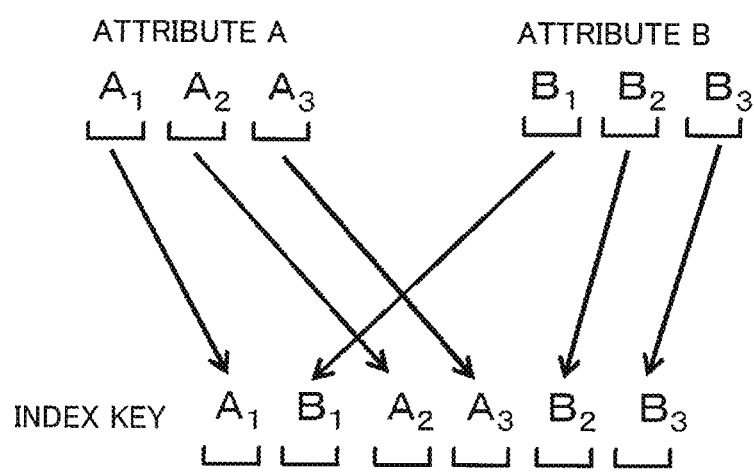
FIG. 4F is a diagram illustrating an example of index key generation according to another exemplary embodiment.

Alternatively, by the use of the index key generating method according to another exemplary embodiment, an index key having bit arrangement as that illustrated in FIG. 4F, for example, can be obtained. FIG. 4F is a diagram illustrating an example of index key generation according to another exemplary embodiment.

In addition to the above, by the use of the index key generating method according to another exemplary embodiment, when the bit string of the attribute value of the attribute A is "$A_1A_2$" and the bit string of the attribute value of the attribute B is "$B_1B_2B_3B_4$", an index key of "$A_1B_1A_2B_2B_3B_4$", "$B_1A_1B_2A_2B_3B_4$", "$B_1B_2A_1B_3A_2B_4$", or "$B_1B_2B_3A_1B_4A_2$" can be generated.

As described above, in another exemplary embodiment, an index key generating technique which is different from those of the compound index and the bit-interleave is employed. The method of an index key generated in the usage of another exemplary embodiment increases the possibility of improving search efficiency in search environments for which an index key generated through the method of any of the compound index and the bit-interleave is unable to improve the search efficiency.

The above-described exemplary embodiments are described below in more detail. In the following description, a first exemplary embodiment and a second exemplary embodiment are described as derailed exemplary embodiments. Each of the following exemplary embodiments illustrates a case in which the above-described index key generating device and index key generating method are applied to a search device. Note that data itself handled in the search device is not particularly limited.

First Exemplary Embodiment

Device Configuration

Figure 5:
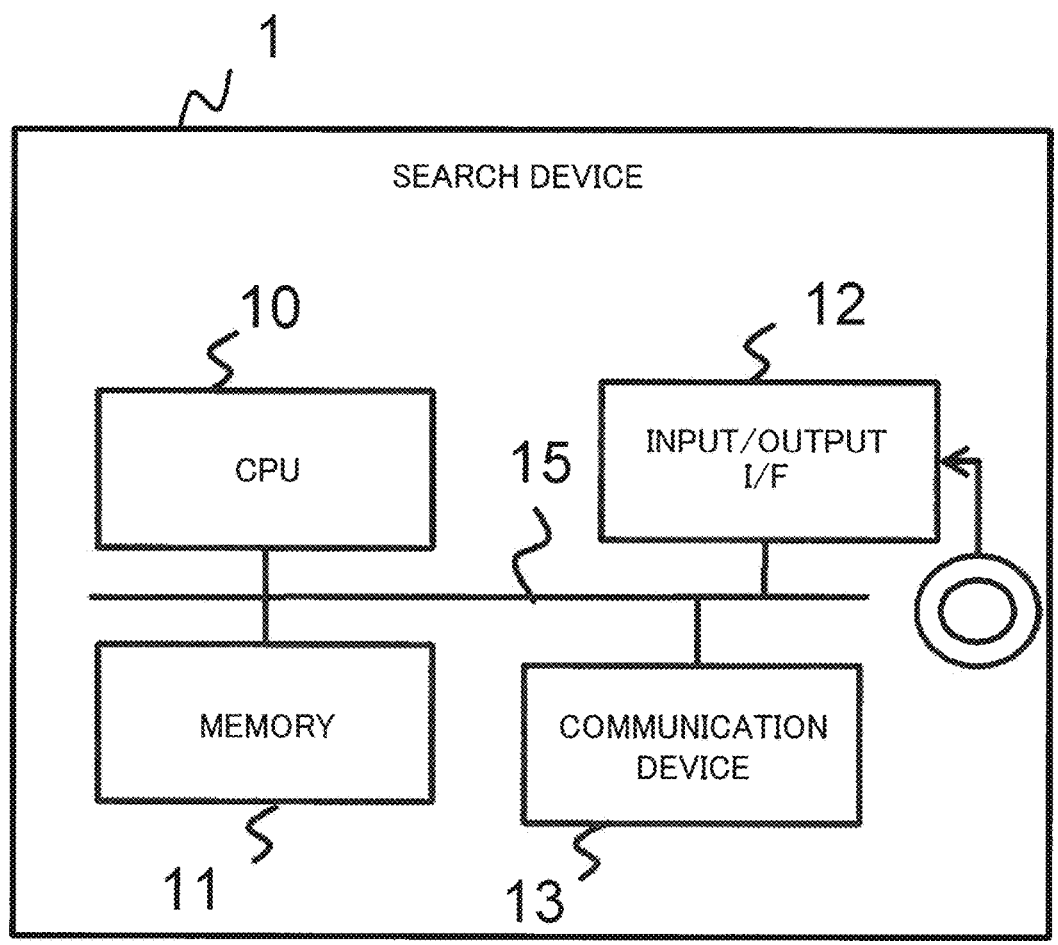
FIG. 5 is a diagram schematically illustrating an example of a hardware configuration of a search device of a first exemplary embodiment.

FIG. 5 is a diagram schematically illustrating an example of a hardware configuration of a search device 1 according to a first exemplary embodiment. As illustrated in FIG. 5, the search device 1 of the first exemplary embodiment includes a CPU (Central Processing Unit) 10, a memory 11, an input/output interface (I/F) 12, a communication device 13, and the like, which are connected to each other via a bus 15 as a hardware configuration. The memory 11 is, for example, a RAM (Random Access Memory), a ROM (Read Only Memory), a hard disk, or a portable storage (recording) medium. The input/output I/F 12 is connectable to, for example, an input device (not illustrated), such as a keyboard or a mouse, which receives an input of a user operation, and an output device (not illustrated), such as a display device or a printer, which provides information to a user. The communication device 13 communicates with other nodes. Note that the search device 1 does not need to include any input device or any output device, and the hardware configuration of the search device 1 is not particularly limited.

As described in the above-described exemplary embodiment, the search device 1 acquires multiple attribute values of multiple attributes for indexing and generates a multidimensional index key corresponding to the attribute values. In addition, the search device 1 acquires query data and searches for data corresponding to the search range indicated in the query data, by the use of an index obtained by sorting an index key generated as described above. Part of the search device 1 corresponds to the above-described index key generating device 100.

[Process Configuration]

Figure 6:
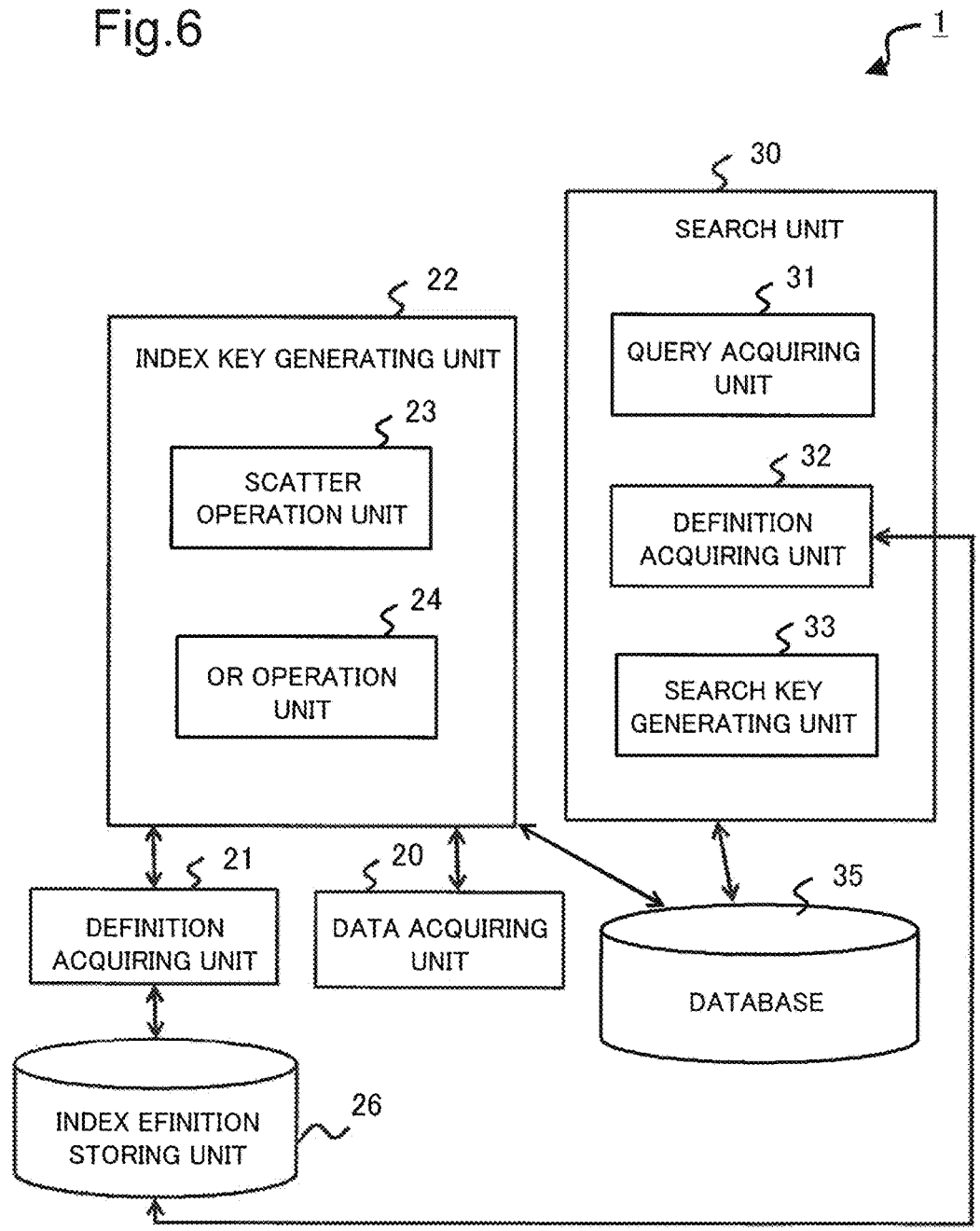
FIG. 6 is a diagram schematically illustrating an example of a process configuration of the search device of the first exemplary embodiment.

FIG. 6 is a diagram schematically illustrating an example of a process configuration of the search device 1 according to the first exemplary embodiment. The search device 1 according to the first exemplary embodiment includes a data acquiring unit 20, a definition acquiring unit 21, an index key generating unit 22, an index definition storing unit 26, a search unit 30, a database 35, and the like. The index key generating unit 22 corresponds to the above-described bit processing unit. These processing units are implemented, for example, by executing, by the CPU 10, a program stored in the memory 11. The program may be installed from a portable recording medium, such as a CD (Compact Disc) or a memory card, or a different computer on a network via the input/output I/F 12, and stored in the memory 11, for example.

The data acquiring unit 20 acquires multiple attribute values of multiple attributes for indexing. The multiple attribute values of the multiple respective attributes for indexing may be acquired from the database 35, may be input by a user operating an input device through an input screen, or may be acquired from a portable recording medium or a different computer via the input/output I/F 12 or the communication device 13. Alternatively, the data acquiring unit 20 may acquire a single data record and acquire multiple attribute values of multiple attributes for indexing from the acquired data record. In this case, the data acquiring unit 20 may acquire schema information on the data record and identify, on the basis of the schema information, attributes for indexing from the multiple attributes constituting the data record.

The index definition storing unit 26 stores the above-described index definition information 105. In this exemplary embodiment, the index definition information 105 includes, for each attribute for indexing, a scatter mask in which bit positions where the respective bits of the attribute are to be arranged in a bit string are masked, the bit string having the same bit length as that of an index key. The index definition information 105 includes information which can identify the scatter mask corresponding to each attribute for indexing. For example, the index definition information 105 may include the correspondence relationship between attribute IDs and scatter masks. Scatter masks are a preferable form for implementing the index definition information 105. Note that, in this exemplary embodiment, the implementation form of the index definition information 105 is not limited to scatter masks as long as indicating, for each attribute for indexing, the arrangement of individual bits of the attribute in an index key.

In this exemplary embodiment, an index key generation pattern indicated by each set of scatter masks included in the index definition information 105 are not particularly limited as long as being set so as to be suitable for a corresponding search environment. Accordingly, the index definition storing unit 26 may store the index definition information 105 which indicates the index key generation patterns illustrated in FIG. 4A and FIG. 4B. Specifically, the index definition information 105 indicates that the order of the bits in the bit string of each attribute is maintained, and that bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively. In addition, the bit length of an index key and a scatter mask is not particularly limited as long as being equal to or longer than the total of the bit lengths corresponding to the data sizes of the respective attributes for indexing.

The index definition storing unit 26 may store multiple pieces of index definition information 105 corresponding to the respective combinations of the attributes for indexing. In this case, the multiple pieces of index definition information stored in the index definition storing unit 26 may include at least two pieces of index definition information having different bit arrangements for the attributes for indexing in an index key. In other words, a different index key generation pattern may be set for each combination of attributes for indexing in each of the multiple pieces of index definition information.

The definition acquiring unit 21 acquires the index definition information 105 corresponding to the combination of attributes of the multiple respective attribute values acquired by the data acquiring unit 20, from the index definition storing unit 26. When the index definition storing unit 26 stores the multiple pieces of index definition information 105, the definition acquiring unit 21 selectively acquires a piece of index definition information 105 corresponding to the combination of attributes of the multiple respective attribute values acquired by the data acquiring unit 20, from the multiple pieces of index definition information 105 stored in the index definition storing unit 26. The index definition information 105 acquired by the definition acquiring unit 21 is sometimes referred to as a scatter mask set.

The index key generating unit 22 generates an index key by arranging, on a bit-by-bit basis, the multiple attribute values acquired by the data acquiring unit 20, on the basis of the scatter mask set acquired by the definition acquiring unit 21. The generated index key is stored in the database 35. As illustrated in FIG. 6, the index key generating unit 22 includes a scatter operation unit 23 and an OR operation unit 24, and generates an index key as described above through operations of these processing units.

The scatter operation unit 23 performs, on each attribute value acquired by the data acquiring unit 20, a scatter operation using the scatter mask corresponding to the attribute of the attribute value.

The OR operation unit 24 performs an OR operation and aggregates the bit strings of the respective attributes each obtained by the scatter operation by the scatter operation unit 23. The bit string obtained by the aggregation serves as an index key.

Figure 7:
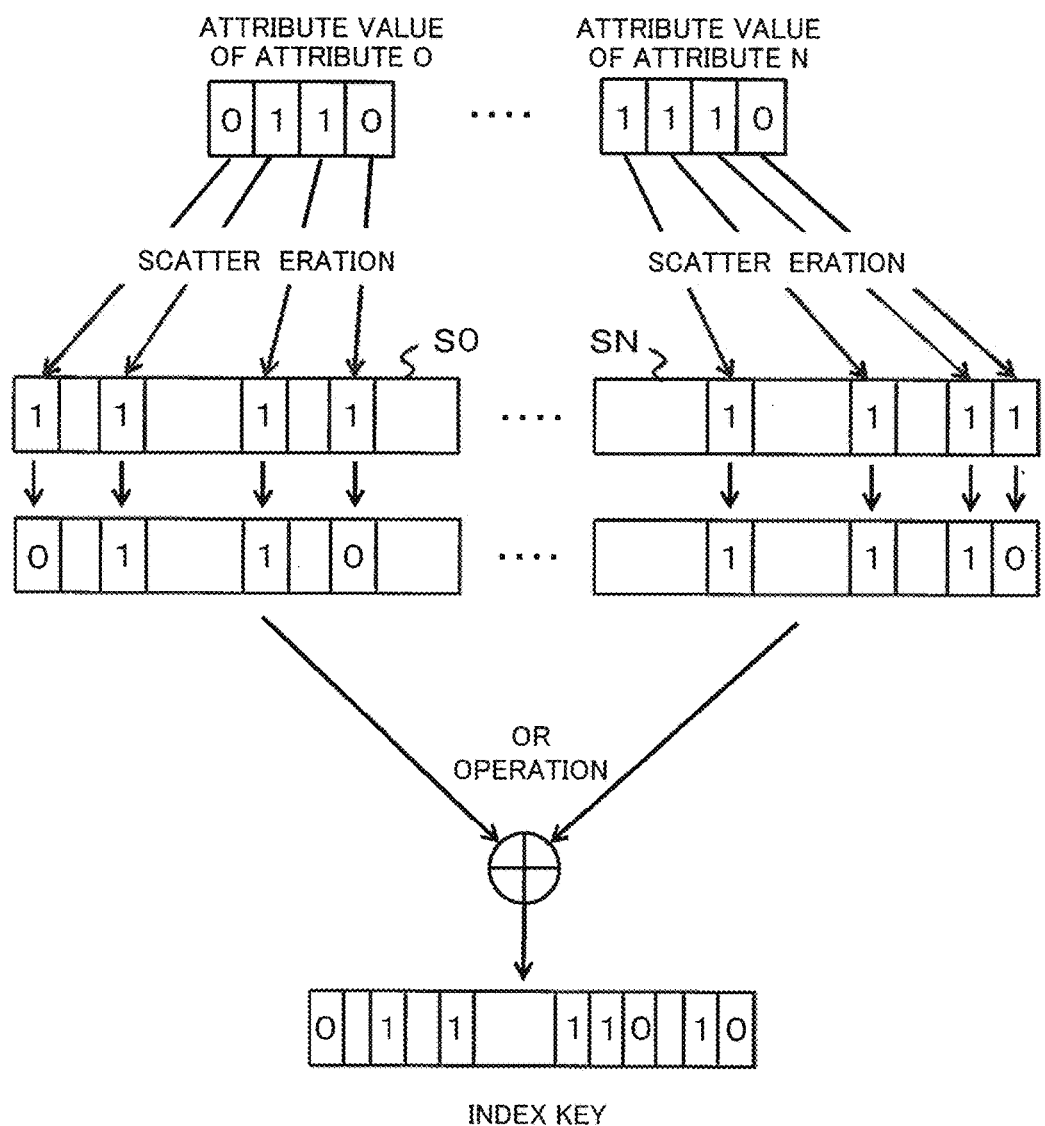
FIG. 7 is a diagram schematically illustrating a flow of index key generation in the first exemplary embodiment.

FIG. 7 is a diagram schematically illustrating a process of generating an index key according to the first exemplary embodiment. In the example in FIG. 7, the reference sign S0 indicates a scatter mask of an attribute 0, and the reference sign SN indicates a scatter mask of an attribute N. In each scatter mask, "1" is set at each of the bit positions where the respective bits of the corresponding attribute are to be arranged. Note that "0" is set at each of the positions other than those at which "1" is set in the scatter mask although not shown in FIG. 7 due to a matter of space in the drawing.

The scatter operation unit 23 arranges each of the bits of each attribute at a bit position among the those at which "1" is set in the scatter mask corresponding to the attribute, the bit position being identified according to the order of the bits of the attribute. The OR operation unit 24 performs an OR operation on the bit strings each obtained by performing a scatter operation on the bit string of the corresponding attribute and consequently generates an index key.

The database 35 stores a set of data including the multiple attribute values of the multiple attributes for indexing and an index formed by sorting index keys generated by the index key generating unit 22. In each index key generated in this exemplary embodiment, the low-order bits corresponding to the bit length of the width of the search range for each attribute in the bit string of the attribute are arranged as close as possible to the low-order bit side (right side) in the index key. In this way, in the index, the index keys corresponding to the search range are located close to each other in the storage medium. The database 35 is implemented in an external memory such as a hard disk included in the memory 11.

The search unit 30 identifies a group of index keys corresponding to a search key to be described later, from the index formed by sorting the index keys generated by the index key generating unit 22 and extracts data records corresponding to the identified group of index keys from the database 35. The extracted data records may be output to a display device or a printing device via the input/output I/F 12, may be stored in a portable recording medium via the input/output I/F 12, or may be transmitted to a different computer via the communication device 13.

As illustrated in FIG. 6, the search unit 30 includes a query acquiring unit 31, a definition acquiring unit 32, and a search key generating unit 33.

The query acquiring unit 31 acquires query data in which a search range based on multiple attributes for searching is specified. The query data may be information input by a user operating the input device through an input screen or the like, or may be information acquired from a portable recording medium or a different computer via the input/output I/F 12 or the communication device 13.

The definition acquiring unit 32 acquires the index definition information 105 (scatter mask set) corresponding to the multiple attributes specified in the query data acquired by the query acquiring unit 31, from the index definition storing unit 26.

The search key generating unit 33 generates search keys corresponding to the multiple attributes specified in the query data, on the basis of the index definition information 105 acquired by the definition acquiring unit 32, the search keys indicating the search range specified by the query data. The generated search keys are multiple index keys indicating the search range. The search key generating unit 33 generates multiple index keys indicating the search range by the same technique as that of the index key generating unit 22. For example, the search key generating unit 33 acquires the attribute values indicating the lower limit of the search range and the attribute values indicating the upper limit of the search range from the query data, performs a scatter operation on the attribute value of each attribute by using the scatter mask corresponding to the attribute, aggregates, by an OR operation, the bit strings each obtained by the scatter operation, and consequently generates an index key corresponding to the lower limit of the search range and an index key corresponding to the upper limit of the search range. The index keys thus generated serve as search keys.

Operation Example

Next, an index key generating method according to the first exemplary embodiment is described with reference to FIG. 8. Although the search device 1 serves as a main operation unit of the method in the following description, each of the above-described processing units included in the search device 1 may serve as a main operation unit instead.

Figure 8:
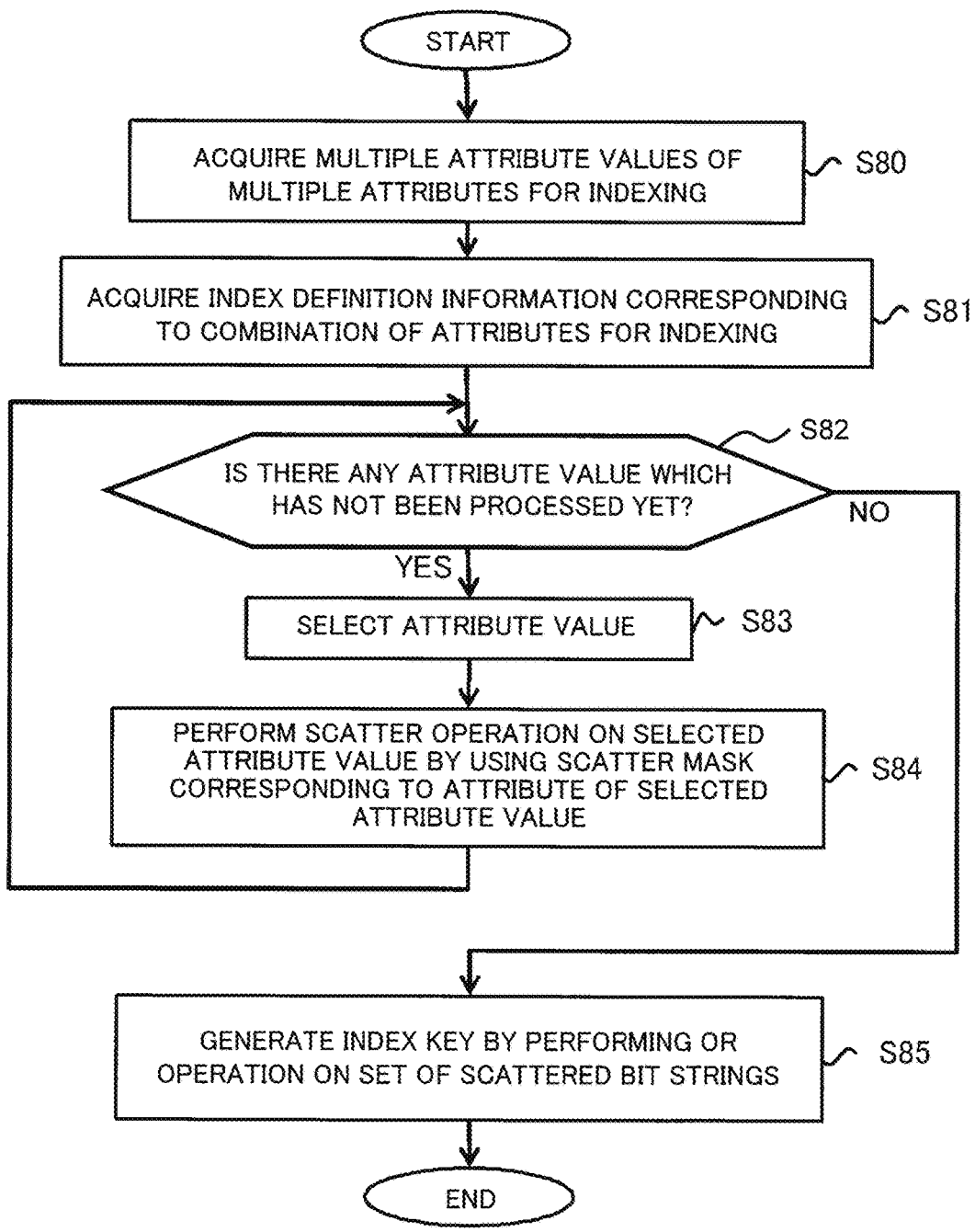
FIG. 8 is a flowchart presenting an example of operation of the search device for an index key generating process in the first exemplary embodiment.

FIG. 8 is a flowchart presenting an operation example of the search device 1 in an index key generating process in the first exemplary embodiment. The search device 1 acquires multiple attribute values of multiple attributes for indexing (S80).

Subsequently, the search device 1 acquires index definition information corresponding to the combination of the attributes for indexing (S81). Through this operation, scatter masks of the respective attributes are acquired.

The search device 1 repeats the following operation until no more attribute value which has not been processed yet is left among the multiple attribute values acquired in (S80) (S82).

The search device 1 selects an attribute value which has not been processed yet from the multiple attribute values acquired in (S80) (S83). The search device 1 performs a scatter operation on the selected attribute value by using the scatter mask corresponding to the attribute of the selected attribute value (S84).

Upon completion of the operation for all the attribute values acquired in (S80) (S82; No), the search device 1 generates an index key by performing an OR operation on the set of bit strings thus scattered (S85).

Next, a search method in the first exemplary embodiment is described with reference to FIG. 9. Although the search device 1 serves as a main operation unit of the method in the following description, each of the above-described processing units included in the search device 1 may serve as a main operation unit instead.

Figure 9:
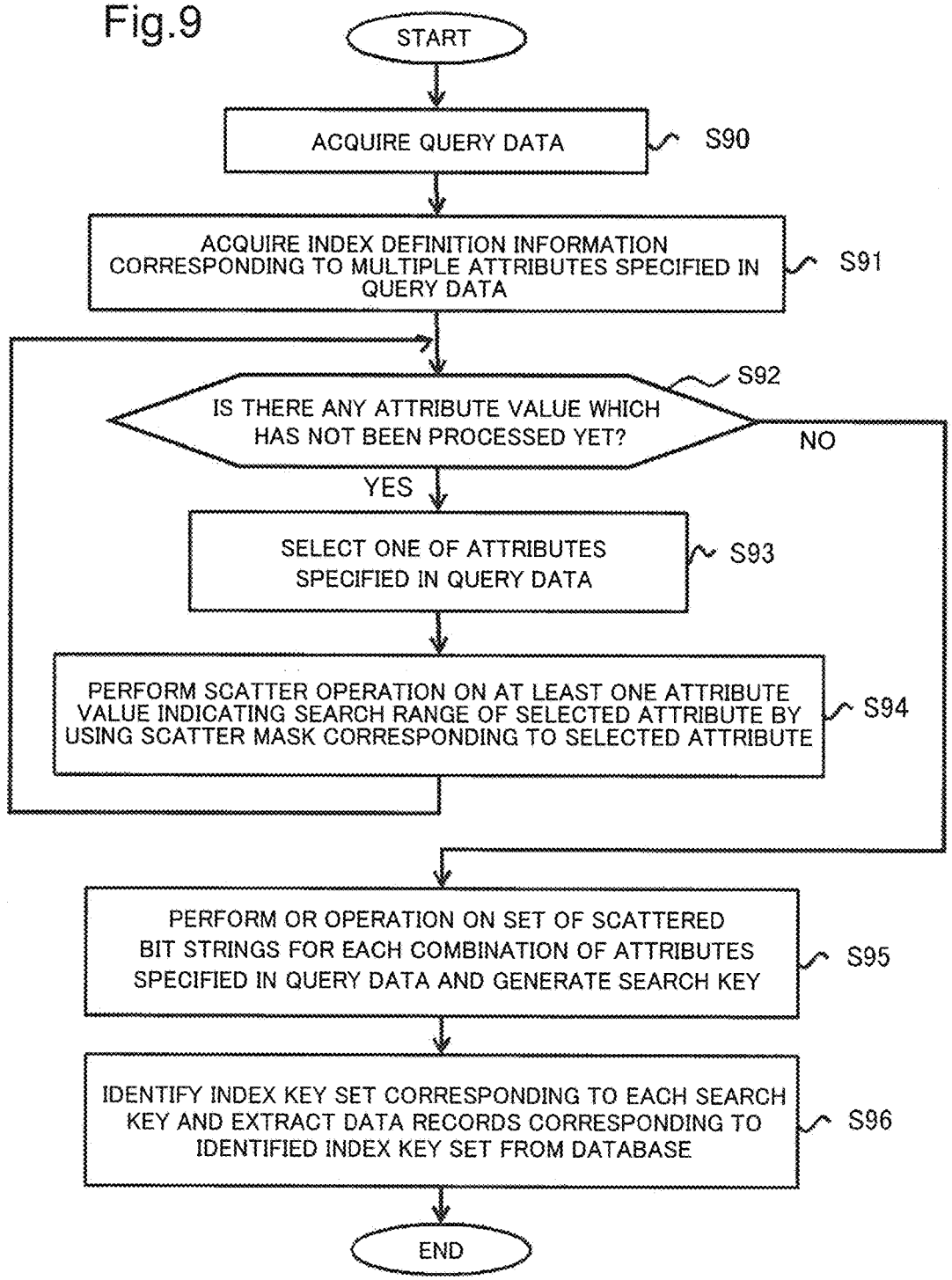
FIG. 9 is a flowchart presenting an example of operation of the search device for a search process in the first exemplary embodiment.

FIG. 9 is a flowchart presenting an operation example of the search device 1 for a search process in the first exemplary embodiment. The search device 1 acquires query data (S90). In the query data, a search range based on multiple attributes for searching is specified. For example, when "gender" and "age" are specified as multiple attributes for searching, "male" and "20 years old or older, and younger than 40 years old" are specified as a search range.

Subsequently, the search device 1 acquires index definition information corresponding to the multiple attributes specified in the query data, from the index definition storing unit 26 (S91). Through this operation, the scatter masks of the respective attributes are acquired.

The search device 1 repeats the following operation until no more attribute which has not been processed yet is left among the multiple attribute values specified in the query data acquired in (S90) (S92).

The search device 1 selects an attribute which has not been processed yet from the multiple attributes specified in the query data (S93).

The search device 1 performs a scatter operation on at least one attribute value indicating the search range based on the selected attribute, by using the scatter mask corresponding to the selected attribute (S94). In the case of the above-described concrete example of the query data, when the attribute "age" is selected, the search device 1 performs a scatter operation on the two attribute values "20 years old" and "40 years old", which define the search range of the attribute "age".

Upon completion of the operation for all the attributes specified in the query data (S92; No), the search device 1 generates a search key by performing an OR operation on the set of bit strings thus scattered, for each combination of the attributes specified in the query data (S95). In the case of the above-described concrete example, for the combination of the attribute "gender" and the attribute "age", a single search key is generated by performing an OR operation on the scatter operation result for the attribute value "male" and the scatter operation result for the attribute value "20 years old". In addition, a single search key is generated by performing an OR operation on the scatter operation result for the attribute value "male" and the scatter operation result for the attribute value "40 years old".

The search device 1 identifies a group of index keys corresponding to the generated search keys, from the index in which the index keys generated by the above-described index key generating method are sorted, and extracts data records corresponding to the group of index keys thus identified, from the database 35 (S96). In this exemplary embodiment, since index keys are generated so as to be suitable for any search environment, the group of index keys identified in (S96) is highly likely to be located in consecutive areas in the storage medium.

Operation and Effects of First Exemplary Embodiment

As described above, in the first exemplary embodiment, the index definition information 105 includes multiple scatter masks corresponding to multiple respective attributes for indexing. Each scatter mask is a bit string having the same bit length as that of a corresponding index key, and bit positions at which respective bits of the corresponding attribute are to be arranged are masked in the bit string. In the first exemplary embodiment, a scatter operation is performed on each of the attribute values on the basis of the scatter mask corresponding to the attribute, the bit strings each obtained by the scatter operation is aggregated by OR operation, and consequently an index key is generated.

Hence, according to this exemplary embodiment, an index key suitable for any search environment can be generated by appropriately setting a scatter mask set included in the index definition information 105, which consequently improves search efficiency.

In addition to the above, according to this exemplary embodiment, since index definition information can be prepared for each combination of attributes for indexing, an index key generation pattern corresponding to each combination of attributes can be used. This enables, for example, the use of a different index generation pattern for each table in the database 35, and an index key which is suitable for any search environment to a greater extent can be used, which consequently facilitates improvement in search efficiency.

According to this exemplary embodiment, index generation patterns are generalized by the use of scatter masks as index definition information. This makes possible for both the compound index and the bit-interleaving, which used to be employed as completely separate methods, to be employed in the single database 35.

In addition to the above, according to this exemplary embodiment, the bit lengths of attributes do not need to be the same as long as the bit length of each generated index key is larger than the total of the bit lengths of respective attributes for indexing. This prevents an increase in size of each index key.

Moreover, according to this exemplary embodiment, each index key is generated by way of scatter operation and OR operation, which facilitates an increase in the speed of the index key generating process. For example, since scatter operation is a basic bit operation, CPUs equipped with hardware solely for scatter operation already exist, and efficient algorithms for scatter operation are already known. In addition, in this exemplary embodiment, each index key is generated by a method in which bit operation is performed on multiple bit strings together. This facilitates parallel computations and makes it possible to use an SIMD (Single Instruction Multiple data) instruction.

Second Exemplary Embodiment

A search device 1 according to a second exemplary embodiment further enables setting of index definition information from an external device and checking the index definition information. Description is given below mainly of the search device 1 according to the second exemplary embodiment in terms of the respects different from the first exemplary embodiment, and description of the same respects as the first exemplary embodiment is omitted where appropriate.

[Process Configuration]

Figure 10:
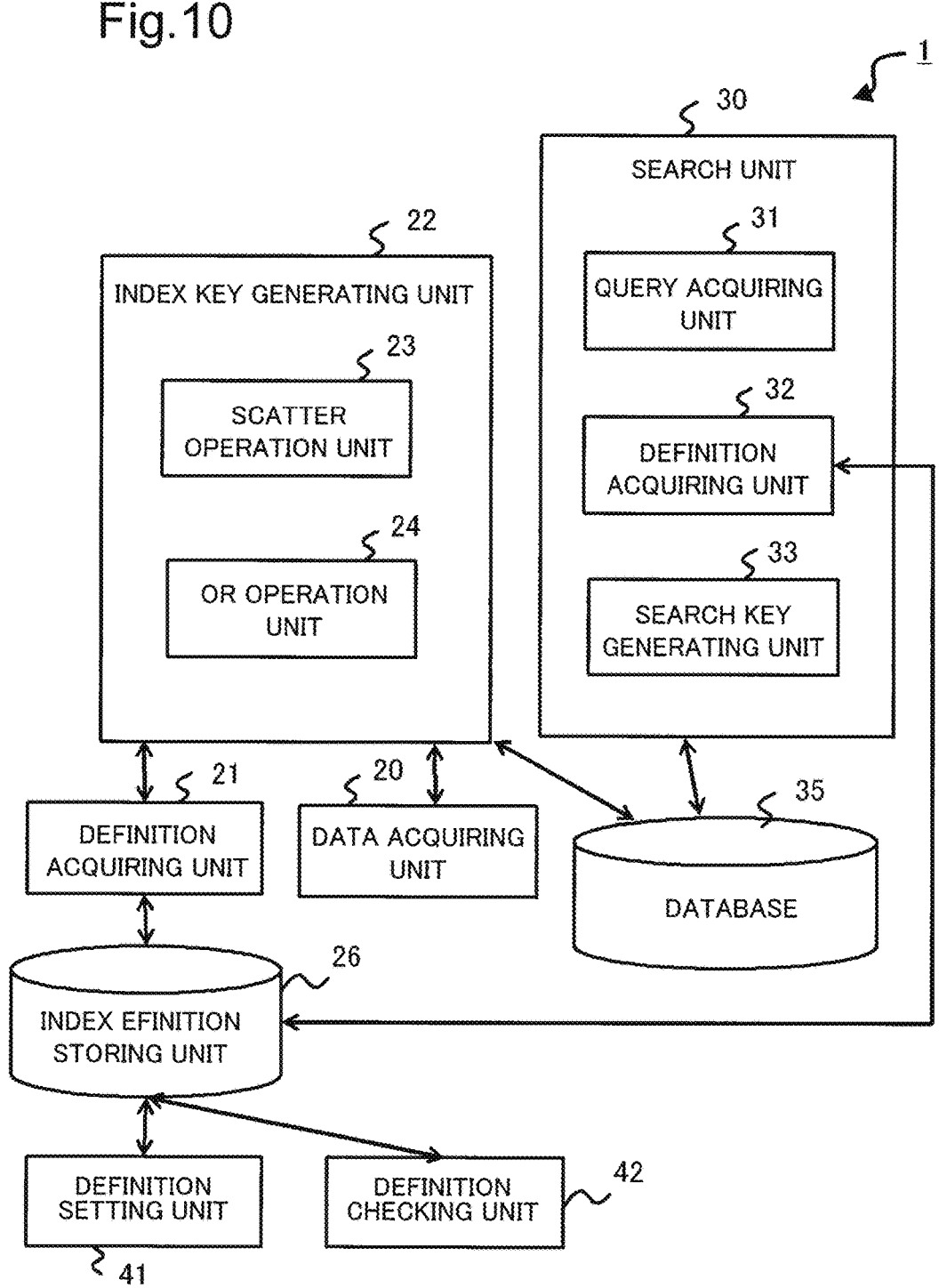
FIG. 10 is a diagram schematically illustrating an example of a process configuration of a search device of the second exemplary embodiment.

FIG. 10 is a diagram schematically illustrating an example of a process configuration of the search device 1 according to the second exemplary embodiment. The search device 1 according to the second exemplary embodiment includes a definition setting unit 41 and a definition checking unit 42 in addition to the processing units of the first exemplary embodiment. Each of these processing units is implemented by executing, by the CPU 10, a program stored in the memory 11 as in the case of the other processing units.

The definition setting unit 41 acquires, for at least one of attributes for indexing, setting data indicating the arrangement of the bits of the attribute in an index key and stores the content of the acquired setting data in the index definition storing unit 26. In the case where the setting data is for changing index definition information already stored in the index definition storing unit 26, the definition setting unit 41 updates the index definition information stored in the index definition storing unit 26, on the basis of the content of the setting data.

The definition setting unit 41 may instruct the search device 1 or a manager terminal to display a screen to be used by the manager of the database 35 or the like to input the setting data, and may acquire the setting data input by the manger or the like via the screen. The screen may be, for example, one on which the manager or the like specifies the bit arrangement for the bit string of each attribute in an index key. For example, the screen may be one which receives an input for specifying a bit of an attribute to be assigned to each position of an index key. Alternatively, the setting data may be acquired from a portable recording medium, a different computer, or the like via the input/output I/F 12.

The definition setting unit 41 acquires the setting data, generates a scatter mask for each attribute on the basis of the setting data, and stores the set of generated scatter masks in the index definition storing unit 26. The definition setting unit 41 may acquire each scatter mask together with an attribute ID which identifies a corresponding attribute, and may store the attribute ID and the scatter mask in the index definition storing unit 26.

The definition checking unit 42 checks the validity of the index definition information stored in the index definition storing unit 26, on the basis of the index key bit arrangement indicated by the index definition information for the attributes for indexing. Specifically, the definition checking unit 42 checks whether all the bits of each attribute are arranged in the index key without missing any bit and whether the bit positions of the respective bits of the attributes do not overlap each other in the index key. The timing for the check by the definition checking unit 42 is not particularly limited.

For example, in the case where scatter masks are used for the index definition information, the definition checking unit 42 can check the validity of all the scatter masks by performing OR operation and AND operation on the scatter masks of the attributes included in the index definition information 105. The definition checking unit 42 counts the number of bits for which 1 is set as a result of the OR operation and checks whether the counted number of bits and the total of the bit lengths of the attributes are the same. When the counted number of bits and the total of the bit lengths of the attributes are the same and the result of the AND operation is zero (0), the definition checking unit 42 determines that all the scatter masks are valid. In other cases, the definition checking unit 42 determines that one or more invalid scatter masks are included. In this way, when scatter masks are used for the index definition information, the definition checking unit 42 can check the validity of the index definition information through simple bit operation.

Operation Example

Figure 11:
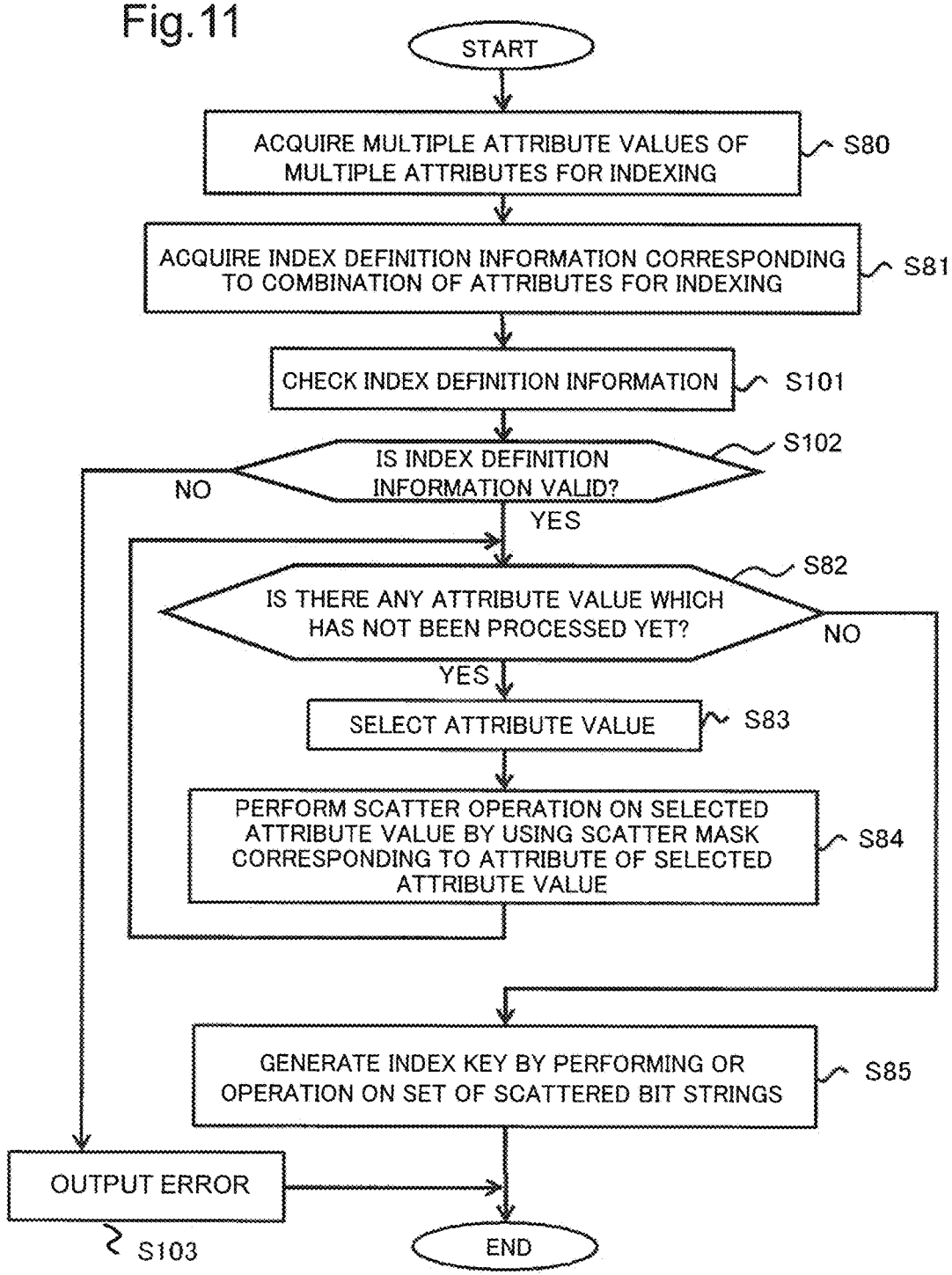
FIG. 11 is a flowchart presenting an example of operation of the search device for an index key generating process in the second exemplary embodiment.

Next, an index key generating method according to the second exemplary embodiment is described with reference to FIG. 11. FIG. 11 is a flowchart presenting an example of operation of the search device 1 for an index key generating process in the second exemplary embodiment. The index key generating method of the second exemplary embodiment is different from that of the first exemplary embodiment in that Step S101, Step S102, and Step S103 are added.

Upon acquisition of index definition information corresponding to the combination of attributes for indexing (S81), the search device 1 checks the validity of the acquired index definition information (S101). Since the check of the validity is the same as that by the above-described definition checking unit 42, description thereof is omitted here. When the index definition information is valid, that is, when all the scatter masks are valid (S102; YES), the search device 1 generates index keys by the same technique as that in the first exemplary embodiment.

In contrast, when the index definition information is not valid, that is, when at least one of the scatter masks is not valid (S102; No), the search device 1 outputs error (S103) and terminates the process. In this exemplary embodiment, the mode for outputting error is not particularly limited.

Operation and Effects of Second Exemplary Embodiment

As described above, in the second exemplary embodiment, setting data is acquired from an external device, and index definition information is generated or updated on the basis of the content of the setting data. Hence, according to this exemplary embodiment, it is possible to make it easier for the manager or the like of the database 35 to design index key generation patterns. Moreover, according to this exemplary embodiment, it is possible to be flexible with adjustment (change) of index key generation patterns according to the obtained state of the search environment and the like.

In addition to the above, in the second exemplary embodiment, index definition information is automatically checked. Hence, according to the second exemplary embodiment, it is possible to reduce generation of erroneous index keys due to, for example, an external mistake in setting of index definition information. Moreover, when a scatter mask set is used as index definition information, the validity of the scatter masks can be checked through simple bit operation using the scatter masks. This enables easy and fast automatic check of the index definition information.

Modified Example

The above-described second exemplary embodiment is an example in which the definition checking unit 42 is included and index definition information is automatically checked. However, the definition checking unit 42 does not need to be included. When a scatter mask set is used as index definition information, the scatter masks provide a data form which makes it easier for users to visually identify the bit arrangement of the bits of each attribute in an index key. Hence, displaying a scatter mask set allows a manager or the like to easily check the validity of the scatter mask set.

In the above-described exemplary embodiments, the search device 1 is implemented as a single device (computer) but may be implemented as multiple devices. Each of the above-described exemplary embodiments may include, for example, an index key generating device which generates an index key and a search device which carries out searching. In this case, the index key generating device includes the data acquiring unit 20, the definition acquiring unit 21, and the index definition storing unit 26, and the search device includes the query acquiring device 31, the definition acquiring unit 32, the search key generating unit 33, and the database 35. Alternatively, each of the exemplary embodiments may include the index generating device, the search device, and a database device storing the database 35.

The above-described exemplary embodiments are described below in more detail through a concrete example of the exemplary embodiments. The present invention is not limited to the following concrete example of the exemplary embodiments.

Concrete Example of Exemplary Embodiments

The concrete example of the exemplary embodiments provides an example in which an index key is generated for a pair of an attribute A represented using four bits and an attribute B represented using two bits. In the following description, the bit string of the attribute A is represented as $[A_1A_2A_3A_4]$, and the bit string of the attribute B is represented as $[B_1B_2]$. In addition, a case of using scatter masks as the index definition information 105 is described as an example.

Assume that the bit arrangement of an index key is $[A_1A_2B_1A_3A_4B_2]$. In this case, the scatter mask for the attribute A is set as [110110], and the scatter mask for the attribute B is set as [001001].

In the compound index described in NPL 1 above, since the bit arrangement of an index key is $[A_1A_2A_3A_4B_1B_2]$, the scatter mask for the attribute A is set as [111100] and the scatter mask for the attribute B is set as [000011].

In the bit-interleave described in NPL 2 above, left-justified arrangement is employed, and hence the bit arrangement of an index key is $[A_1B_1A_2B_2A_3A_4]$. Accordingly, the scatter mask for the attribute A is set as [101011], and the scatter mask for the attribute B is set as [010100].

As described above, according to each of the above-described exemplary embodiments, the bit arrangement of the bits of each attribute in an index key can be minutely defined for wide use. In other words, according to each of the above-described exemplary embodiments, it is possible to define an index key which makes it possible for the records of a record set acquired through a range search to be arranged close to each other in a storage medium, in order to enable fast range search.

Although scatter masks are used as an example of a preferable form for implementing the index definition information 105 in the concrete example of the exemplary embodiments, the index definition information 105 may be data which can indirectly generate a set of bit strings of scatter masks. For example, the index definition information 105 in the above-described example may be defined as [A:2, B:1, A:2, B:1] as data in which pairs of an attribute name and the number of bits are listed. In this case, an index key consists of the first two bits of the attribute A, the first one bit of the attribute B, the next two bits of the attribute A, and the next one bit of the attribute B. There may be various other implementation forms of the index definition information 105. As described above, the index definition information 105 is not limited to a particular implementation form as long as uniquely indicating the positions of the respective bits of each attribute in an index key. Scatter masks of attributes may be generated on the basis of the index definition information 105 thus configured.

Next, a concrete example of an index key generating method is described with reference to FIG. 8.

The search device 1 acquires the attribute value $[A_1A_2A_3A_4]$ of the attribute A and the attribute value $[B_1B_2]$ of the attribute value B (S80) and acquires also the scatter mask [110110] for the attribute A and the scatter mask [001001] for the attribute B (S81).

The search device 1 performs a scatter operation on the attribute value $[A_1A_2A_3A_4]$ of the attribute A by using the scatter mask [110110] for the attribute A (S84). As a result of this scatter operation, the bit string $[A_1A_20A_3A_40]$ is generated. Moreover, the search device 1 performs a scatter operation on the attribute value $[B_1B_2]$ of the attribute B by using the scatter mask [001001] for the attribute B (S84). As a result of this scatter operation, the bit string $[00B_100B_2]$ is generated.

Since scatter operation (computation) is a basic bit operation, CPUs equipped with hardware solely for scatter operation already exist, and efficient algorithms each including a combination of general bit operations are already known, for example. In this example, scatter operation employing a parallel prefix algorithm, which is one of the known algorithms mentioned as the latter example, is illustrated.

A parallel prefix algorithm is a recursive algorithm and enables scatter operation by moving all the bits to approximate positions by one step. For the purpose of illustration, scatter operation using scatter masks each widened to have eight bits, which is one of power of two, is illustrated. In this example, the attribute value of the attribute A is represented as $[0000A_1A_2A_3A_4]$, and a scatter operation is performed on this bit string by using the scatter mask [00110110] for the attribute A.

First, the scatter mask is divided into two parts in the same lengths. In this example, the scatter mask [00110110] is divided into the high-order bit string [0011] and the low-order bit string [0110].

Then, the number of bits of 1 which is set in the high-bit string [0011] is counted. In this example, two is obtained as the number of bits.

Thereafter, the two bits from the higher-order bits in the low-order bit string obtained by dividing the bit string for scattering into two parts in the same lengths are moved to the high-order bit string, that is, the two bits as the counted number are moved.

In this example, the two higher-order bits (the number of the bits are obtained by counting), that is, $[A_1A_2]$ of the low-order bit string $[A_1A_2A_3A_4]$ in $[0000A_1A_2A_3A_4]$ for scattering are moved to the high-order bit string. As a result, $[00A_1A_200A_3A_4]$ is obtained.

Then, the obtained bit string $[00A_1A_200A_3A_4]$ is divided into two parts $[00A_1A_2]$ and $[00A_3A_4]$ in the same lengths. This leads to the first problem of performing a scatter operation on $[00A_1A_2]$ for scattering by using the scatter mask [0011] and the second problem of performing a scatter operation on $[00A_3A_4]$ for scattering by using the scatter mask [0110].

Then, the same procedure as that described above is recursively repeated for each of the two problems. The scatter operations, which are performed on the respective data sets, can be performed in parallel.

In the above first problem, no bit is moved, and the bit string $[00A_1A_2]$ is divided into two equal parts [00] and $[A_1A_2]$. As a result, the first problem is led to the third problem of performing a scatter operation on [00] for scattering by using the scatter mask [00] and the fourth problem of performing a scatter operation on $[A_1A_2]$ for scattering by using the scatter mask [11].

In terms of the above second problem, the highest-order bit of the low-order bit string $[A_3A_4]$ is moved to the high-order bit string, the bit string $[0A_30A_4]$ is consequently obtained, and the bit string is divided into two parts $[0A_3]$ and $[0A_4]$ in the same lengths. As a result, the second problem is led to the fifth problem of performing a scatter operation on $[0A_3]$ for scattering by using the scatter mask [01] and the sixth problem of performing a scatter operation on $[0A_4]$ for scattering by using the scatter mask [10].

The individual problems are further processed recursively. As a result, the above third problem is led to two problems of performing a scatter operation on [0] for scattering by using the scatter mask [0]. The above fourth problem is led to a problem of performing a scatter operation on $[A_1]$ for scattering by using the scatter mask [1] and the problem of performing a scatter operation on $[A_2]$ for scattering by using the scatter mask [1]. The above fifth problem is led to the problem of performing a scatter operation on [0] for scattering by using the scatter mask [0] and the problem of performing a scatter operation on $[A_3]$ for scattering by using the scatter mask [1]. In the above sixth problem, the lowest-order bit $[A_4]$ is moved to the higher-order bit, the bit string $[A_40]$ is consequently obtained, and the bit string is divided into two parts $[A_4]$ and [0]. As a result, the sixth problem is led to a problem of performing a scatter operation on $[A_4]$ for scattering by using the scatter mask [1] and a problem of performing a scatter operation on [0] for scattering by using the scatter mask [0].

When the bit length of a scatter mask reaches 1, further division is not possible, and the recursive process is terminated. As a result, $[00A_1A_20A_3A_40]$ is obtained. Thus, since scatter operation can be performed for a scatter mask of a bit length of n (=8) in O (log n) steps (=3), employing such a parallel prefix algorithm enables efficient scatter operation. When an original attribute value is not exponential in 2, the attribute value is padded with 0 so as to make the attribute value exponential in 2 as described above, and a desired result can be obtained by removing 0 thus padded from the result of the scatter operation.

As described above, through the scatter operations, the bit string $[A_1A_20A_3A_40]$ is generated for the attribute A, and the bit string $[00B_100B_2]$ is generated for the attribute B. The search device 1 aggregates the results of the respective scatter operations to a single bit string by an OR operation (S85). As a result, $[A_1A_2B_1A_3A_4B_2]$ is obtained as an index key. Since the OR operation is prepared in the form of hardware, fast operation is possible.

In addition, the above-described algorithm is compatible with a CPU having an SIMD instruction, which is a function of performing the same operation on multiple pieces of data simultaneously. This is because parallel processing is carried out for a long bit string all at once by an SIMD instruction. As described above, the concrete example of the exemplary embodiments indicates that an index key for wide use can be defined and that an index key can be efficiently generated according to any of the above-described exemplary embodiments.

Although the attribute A of four-bit length and the attribute B of two-bit length are used as an example in the concrete example of the exemplary embodiments, the bit length of each attribute is not limited. Since the index key is prepared for each schema of records, the index definition information 105 may be stored in association with the schema name of the record. To refer to the index definition information 105 for the record having a certain schema, the index definition information 105 can be identified on the basis of the schema name.

In the multiple flowcharts used in the above description, multiple steps (operations) are listed in order. However, the order of carrying out the steps of each of the exemplary embodiments is not limited to the described one. In each of the exemplary embodiments, it is possible to change the order of the illustrated steps within the range of not causing any problem in terms of the content. Moreover, the above-described exemplary embodiments and modified example can be combined within the range of not contradicting in terms of the content.

This application claims the priority based on Japanese Patent Application No. 2013-003842 filed on Jan. 11, 2013, the entire disclosure of which is incorporated herein.

What is claimed is:

1. An index key generating device comprising:
a processor configured to:
acquire a plurality of attribute values of a plurality of attributes of each of a plurality of records to be indexed, the bits of the plurality of attributes being arranged in a starting order;
for each of the records to be indexed: generate an index key that is a multi-attribute value bit string that includes a different number of attributes than a number of the plurality of attributes or in which bits of the same number of attributes are arranged in a different order than the starting order, by arranging, on a bit-by-bit basis, the acquired plurality of attribute values, wherein a first bit string segment of the multi-attribute value bit string includes bit values of at least two of the attributes being arranged alternately, and a second bit string segment of the multi-attribute value bit string includes at least two bit values of one of the attributes being arranged consecutively; and
sort and store the records corresponding to the multi-attribute value bit strings according to the generated index key.

2. The index key generating device according to claim 1, wherein
the generation of the multi-attribute value bit string, for each of the records to be indexed, is based on index definition information that includes, for each of the attributes for indexing, a scatter mask in which bit positions of the respective bits of the attribute are masked in a bit string having the same bit length as that of the index key, and
the processor performs a scatter operation on each of the acquired attribute values, by using the scatter mask corresponding to the attribute of the attribute value, and aggregates, by an OR operation, the bit strings of the attributes each obtained by the scatter operation, and thereby generates the index key.

3. The index key generating device according to claim 1, wherein the processor selectively acquires, from a plurality of pieces of index definition information corresponding to respective combinations of the attributes for indexing, a piece of index definition information corresponding to a combination of attributes of the acquired plurality of attribute values.

4. The index key generating device according to claim 3, wherein the plurality of pieces of index definition information include at least two pieces of index definition information each including bit arrangements for the respective attributes for indexing, the bit arrangements being different between the pieces of index definition information.

5. The index key generating device according to claim 1, wherein the processor is further configured to: acquire setting data indicating, for at least one of the attributes for indexing, an arrangement of bits of the at least one attribute in the index key and updates the index definition information with content of the acquired setting data.

6. The index key generating device according to claim 1, wherein the processor is further configured to: check validity of the index definition information on the basis of the arrangement of the bits of each of the attributes for indexing in the index key, the arrangement being indicated by the index definition information.

7. The index key generating device according to claim 1, wherein the index definition information indicates that an order in a bit string of each of the attributes is maintained, and that a bit arrangement in which one of a first bit string and a second bit string and the same bit string are arranged adjacent to each other with the other bit string arranged therebetween is included at least partially, the first bit string including bit values of the attributes being arranged alternately, and the second bit string including at least two bit values of one of the attributes being arranged consecutively.

8. An index key generating method comprising:
acquiring a plurality of attribute values of a plurality of attributes of each of a plurality of records to be indexed, the bits of the plurality of attributes being arranged in a starting order;
for each of the records to be indexed: generating an index key that is a multi-attribute value bit string that includes a different number of attributes than a number of the plurality of attributes or in which bits of the same number of attributes are arranged in a different order than the starting order, by arranging, on a bit-by-bit basis, the acquired plurality of attribute values, wherein a first bit string segment of the multi-attribute value bit string includes bit values of at least two of the attributes being arranged alternately, and a second bit string segment of the multi-attribute value bit string includes at least two bit values of one of the attributes being arranged consecutively; and
sorting and storing the records corresponding to the multi-attribute value bit strings according to the generated index key.

9. The index key generating method according to claim 8, wherein
the generation of the multi-attribute value bit string, for each of the records to be indexed, is based on index definition information that includes, for each of the attributes for indexing, a scatter mask in which bit positions of the respective bits of the attribute are masked in a bit string having the same bit length as that of the index key, and
in the generating of the index key, a scatter operation is performed on each of the acquired attribute values by using the scatter mask corresponding to the attribute of the attribute value, and the bit strings of the attributes each obtained by the scatter operation are aggregated by an OR operation, and thereby the index key is generated.

10. The index key generating method according to claim 8, wherein, in the acquiring of the index definition information, a piece of index definition information corresponding to a combination of attributes of the plurality of attribute values acquired by the data acquiring unit is selectively acquired from a plurality of pieces of index definition information corresponding to respective combinations of the acquired attributes for indexing.

11. The index key generating method according to claim 10, wherein the plurality of pieces of index definition information include at least two pieces of index definition information each including bit arrangements for the respective attributes for indexing, the bit arrangements being different between the pieces of index definition information.

12. The index key generating method according to claim 8, further comprising:
acquiring setting data indicating, for at least one of the attributes for indexing, an arrangement of bits of the attribute in the index key; and
updating the index definition information with content of the acquired setting data.

13. The index key generating method according to claim 8, further comprising checking validity of the index definition information on the basis of the arrangement of the bits of each of the attributes for indexing in the index key, the arrangement being indicated by the index definition information.

14. The index key generating method according to claim 8, wherein the index definition information indicates that order in a bit string of each of the attributes is maintained, and that a bit arrangement in which one of a first bit string and a second bit string and the same bit string are arranged adjacent to each other with the other bit string arranged therebetween is included at least partially, the first bit string including bit values of the attributes being arranged alternately, the second bit string including at least two bit values of one of the attributes being arranged consecutively.

15. A non-transitory computer readable medium which stores a program causing a computer to execute an index key generating method, the method comprising:
acquiring a plurality of attribute values of a plurality of attributes of each of a plurality of records to be indexed;
for each of the records to be indexed: generating an index key that is a multi-attribute value bit string that includes a different number of attributes than a number of the plurality of attributes or in which bits of the same number of attributes are arranged in a different order than the starting order, by arranging, on a bit-by-bit basis, the acquired plurality of attribute values, wherein a first bit string segment of the multi-attribute value bit string includes bit values of at least two of the attributes being arranged alternately, and a second bit string segment of the multi-attribute value bit string includes at least two bit values of one of the attributes being arranged consecutively; and
sorting and storing the records corresponding to the multi-attribute value bit strings according to the generated index key.

* * * * *